United States Patent [19]
Yeh

[11] Patent Number: 5,519,550
[45] Date of Patent: May 21, 1996

[54] TAPE CASSETTE ADAPTER FOR CONVERTING A COMPACT TAPE CASSETTE TO A STANDARD SIZE TAPE CASSETTE FOR APPLICATION IN A GENERAL VIDEO-TAPE PLAYER

[76] Inventor: Tsun-Wan Yeh, 3F, No. 149, Nan-Ta Rd., Hsin-Chu City, Taiwan

[21] Appl. No.: 333,836

[22] Filed: Nov. 3, 1994

[51] Int. Cl.[6] .................................................. G11B 15/66
[52] U.S. Cl. .............................................. 360/94; 360/96.3
[58] Field of Search ........................... 360/94, 96.3, 96.5, 360/132

[56] References Cited

U.S. PATENT DOCUMENTS 4,544,970 10/1985 Ogata .......................................... 360/94
5,105,319 4/1992 Ohoko et al. .......................... 360/132 X

FOREIGN PATENT DOCUMENTS 2089319 6/1982 United Kingdom ..................... 360/94

*Primary Examiner*—John H. Wolff
*Attorney, Agent, or Firm*—Rodman & Rodman

[57] ABSTRACT

A tape cassette adapter for a compact tape cassette includes a standard cassette case with a recess for receiving the compact tape cassette, a tape draw-out unit having a pair of arms pivoted within the standard cassette case and movable operatively between first and second positions so as to draw the tape member of the compact tape cassette to form a predetermined tape path, a reel drive unit mounted within the standard cassette case for driving the take-up reel of the compact tape cassette, and an arm-driving unit having a cam member mounted rotatably within the standard cassette case. The cam member engages one of the arms and is actuatable so as to move the corresponding arm operatively between the first and second positions.

18 Claims, 7 Drawing Sheets

5,519,550

TAPE CASSETTE ADAPTER FOR CONVERTING A COMPACT TAPE CASSETTE TO A STANDARD SIZE TAPE CASSETTE FOR APPLICATION IN A GENERAL VIDEO-TAPE PLAYER

BACKGROUND OF THE INVENTION

1. Field of the Invention

This invention relates to a tape cassette adapter, more particularly to a tape cassette adapter which can convert a compact tape cassette, such as a 8 mm. camera video tape cassette, into a standard size tape cassette, such as a VHS or a Beta tape cassette, so as to apply the compact tape cassette to a general domestic video tape player.

2. Description of the Related Art

The invention is an improvement of a conventional tape cassette adapter, as shown in FIG. 1, which is used for converting a compact tape cassette 100 into a standard size tape cassette. The compact tape cassette 100 is smaller in size and lighter in weight than the standard size tape cassette.

The conventional tape cassette adapter includes a standard cassette case 11 which confines an upper opening 111 through which the compact tape cassette 100 can be placed into the standard cassette case 11, and a pivotable front cap 12 mounted on the standard cassette case 11. Two grooves are formed respectively in two opposite sides of the upper opening 111. A drive cover 13 has two opposite edges inserted slidably within the grooves of the upper opening 111 so as to close or open the upper opening 111. One of the opposite edges of the drive cover 13 is formed with a rack portion 131, as shown in FIG. 2.

Referring to FIGS. 1 and 2, the conventional tape cassette adapter further includes a tape draw-out unit which consists of a pair of fixing blocks 14, 15 and a pair of arms 16, 17, an arm-driving unit which consists of a first idle gear 101 and a first drive gear 102, and a reel drive unit which consists of a second drive gear 18 and a second idle gear 19.

The arms 16, 17 are mounted pivotally within the standard cassette case 11 and are movable operatively between first and second positions so as to draw the tape member 1001 of the compact tape cassette 100, by means of two rods 161, 171 secured on the end portions of the arms 16, 17, to form a predetermined tape path responsive to movement from the first position to the second position. The arm 16 has a lower fan tooth portion 162 formed thereon. The tape member 1001 of the compact tape cassette 100 is wound on a take-up reel 1002 and a support reel 1003 of the compact tape cassette 100.

The fixing blocks 14, 15 are mounted pivotally within the standard cassette case 11 and are restricted to move forward and backward automatically by means of two extension springs 105, 106. When moved to close the upper opening 111, the drive cover 13 can push the fixing blocks 14, 15 forward to position releasably the arms 16, 17 at their second positions in a known manner.

The first drive gear 102, which is mounted rotatably within standard cassette case 11, has a semi-circular tooth portion 1022 which engages the fan tooth portion 162 of the arm 16 and a circular tooth portion 1021 which engages first idle gear 101 that in turn meshes with the rack portion 131 of the drive cover 13. Accordingly, when the drive cover 13 is moved to urge the first idle gear 101, the first drive gear 102 can be driven to swing the arm 16. At the same time, the movement of the drive cover 13 can also swing the arm 17 in a known manner.

The second drive gear 18, which is mounted pivotally within the standard cassette case 11, meshes with an inner tooth portion 192 of the second idle gear 19 and is equipped with a pulley 181. A belt 104 is associated with the pulley 181 and a pulley 1031 of a third drive gear 1032. The third drive gear 1032 is mounted rotatably on one end of a clutch rod 103 and engages the rack portion 131 of the drive cover 13. The other end of the clutch rod 103 is pivoted to the standard cassette case 11. When the drive cover 13 is moved forward, the clutch rod 103 and the third drive gear 1032 are moved forward to loosen the belt 104 and thus, the second drive gear 18 is not rotated thereby. At the same time, the arm 16 is turned to its second position by rotation of the first drive gear 102 and the first idle gear 101. When the drive cover 13 is moved backward, the belt 104 is tightened by rearward movement of the third drive gear 1032 and the clutch rod 103 to rotate the second drive gear 18 and the second idle gear 19. In this way, an outer tooth portion 191 of the second idle gear 19, which engages the take-up reel 1002 of the compact tape cassette 100, can drive the take-up reel 1002 to wind the tape member 1001 of the compact cassette case 100 from the predetermined tape path to the compact tape cassette 100 prior to removal of the compact cassette case 100 from the standard cassette case 11.

The drawbacks of the conventional tape cassette adapter are as follows:

1. Owing to its complicated construction, more particularly to the arm-driving unit which includes many gears, the conventional tape cassette adapter easily breaks down after a long-term use. Of course, it is difficult to manufacture the conventional tape cassette adapter.

2. When the drive cover 13 is moved forwardly to turn the arm 16 to its second position so as to draw the tape member 1001 from the compact tape cassette 100 to form a predetermined tape path, the tape member 1001 is easily overdrawn from the compact tape cassette 100 due to the moment of inertia on the take-up reel 1002 and the reel drive unit. Thus, when the second drive gear 18 of the reel drive unit is driven by means of a domestic video tape player to rotate take-up reel 1002 in order to wind the tape member 1001, a strong tensile stress is formed on the overdrawn tape member 1001 so that the tape member 1001 may easily snap.

SUMMARY OF THE INVENTION

Therefore, the main objective of this present invention is to provide a tape cassette adapter which has an improved arm-driving unit that requires fewer parts in order to reduce the probability of breakdown of the tape cassette adapter after a long-term use.

Another objective of this present invention is to provide a tape cassette adapter which has a brake lever mounted therewithin in order to avoid unnecessary rotation of the take-up reel of the compact tape cassette, thereby preventing overdrawing of the tape member from the compact tape cassette.

According to this invention, a tape cassette adapter for a compact tape cassette includes a standard cassette case, a tape draw-out unit, a reel drive unit, an arm-driving unit and a brake lever. The compact tape cassette has a tape member wound on a supply reel and a take-up reel and is smaller in size and lighter in weight than a standard size tape cassette.

The standard cassette case confines a recess for receiving the compact tape cassette and has an upper opening to access the recess, and a pair of grooves formed in two opposite sides of the upper opening. A drive cover has two opposite edges inserted respectively and slidably within the grooves.

The tape draw-out unit includes a pair of arms mounted pivotally within the standard cassette case and movable operatively between first and second positions so as to draw the tape member from the compact tape cassette to form a predetermined tape path responsive to movement from the first position to the second position.

The reel drive unit is mounted within the standard cassette case for driving the take-up reel of the compact tape cassette.

The arm-driving unit has a cam member mounted rotatably within the standard cassette case. The cam member has a curved camming surface that engages one of the arms and is actuatable so as to move the corresponding arm operatively between the first and second positions. The drive cover moves operatively the other one of the arms between the first and second positions when the drive cover slides along the grooves.

The brake lever is mounted operatively within the standard cassette case for engaging releasably the reel drive unit when the arms are at their second position so as to stop unnecessary rotation of the reel drive unit.

The cam member of the arm-driving unit includes a gear wheel and a cam projection which is formed on a top surface of the gear wheel. The arm-driving unit further includes a rack portion which is formed on one of the opposite edges of the drive cover and which engages the gear wheel so as to enable the drive cover to drive rotatably the cam member when the drive cover slides along the grooves. The cam projection has a generally semi-circular section, a gap confined between two ends of the semi-circular section, and a curved guide section extending from one of the ends of the semi-circular section to a central portion of the gear member. The corresponding arm is formed with a cam follower face which is engageable with the curved guide section of the cam projection so as to guide the corresponding arm between the first and second positions and which is engageable with the semi-circular section of the cam projection so as to maintain the corresponding arm at its second position. The camming face and the cam follower face are configured so as to cause the corresponding arm to rotate in a same direction as the gear wheel.

The recess of the standard cassette case is a rectangular recess which has two opposite side walls and a rear wall that interconnects the opposite side walls. The brake lever includes a substantially L-shaped body which has a first section mounted pivotally within the standard cassette case and located adjacent to the rear wall of the rectangular recess, and a second section located adjacent to one of the opposite side walls of the rectangular recess and provided with a brake element for contacting the reel drive unit. The brake lever further includes a biasing member interconnecting the L-shaped body and the standard cassette case for biasing the L-shaped body to pivot so as to allow contact between the brake element and the reel drive unit. The L-shaped body further has a nose projecting outwardly therefrom and being engageable with the cam projection of the cam member so as to release the brake element from the reel drive unit when the arms move between the first and second positions.

A tape-winding control unit is mounted rotatably within the standard cassette case and is driven rotatably by the arm-driving unit. The tape-winding control unit is connected to the reel drive unit and is capable of actuating the reel drive unit to drive the take-up reel and to wind the tape member from the predetermined tape path to the compact tape cassette when the arms move from the second position to the first position.

BRIEF DESCRIPTION OF THE DRAWINGS

Other features and advantages of this present invention will become apparent in the following detailed description of a preferred embodiment of this invention, with reference to the accompanying drawings, in which.

DETAILED DESCRIPTION OF THE PREFERRED EMBODIMENT

Figure 3:
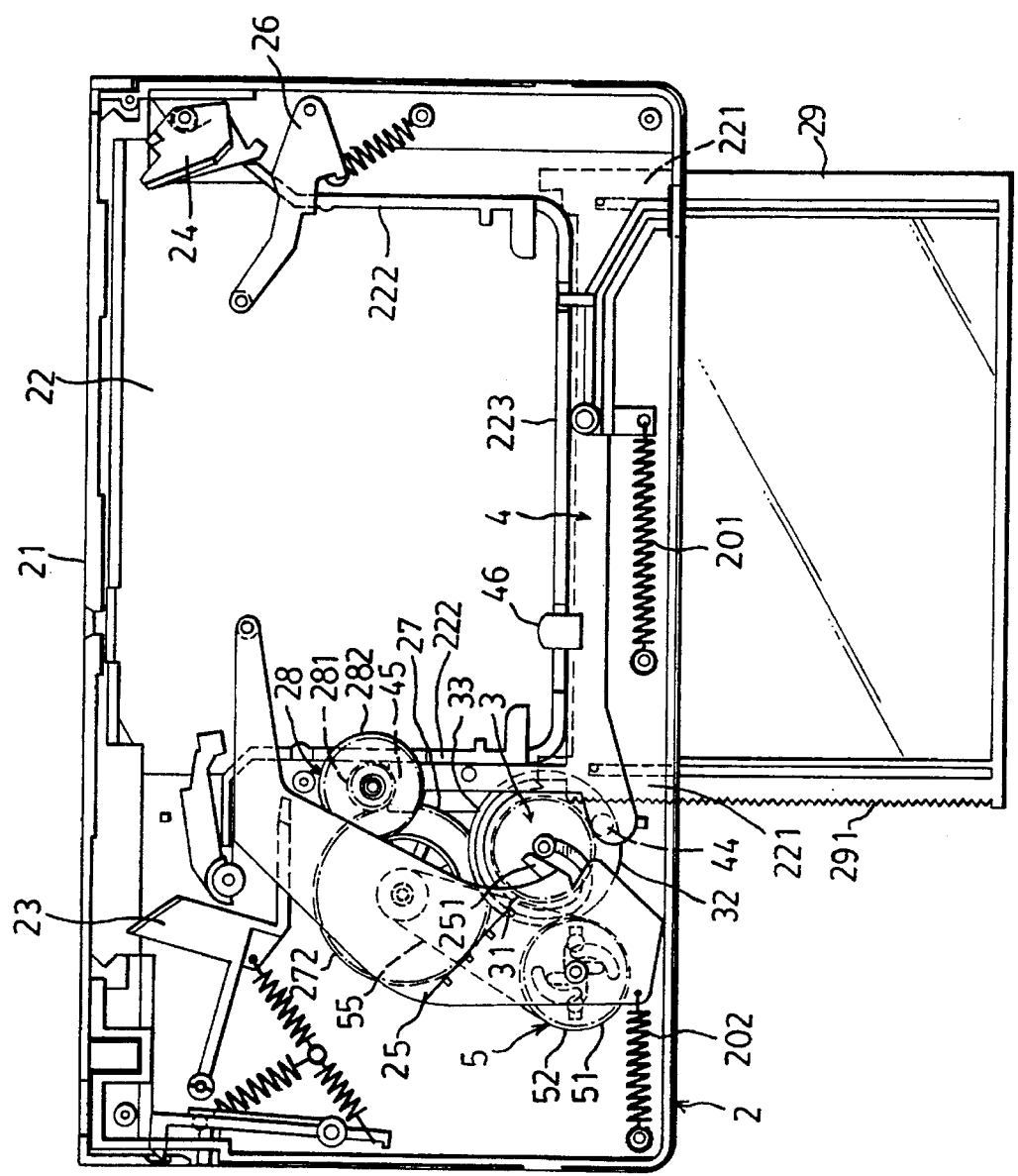
FIG. 3 is a bottom elevational view showing a tape cassette adapter according to the preferred embodiment of this invention.
Figure 10:
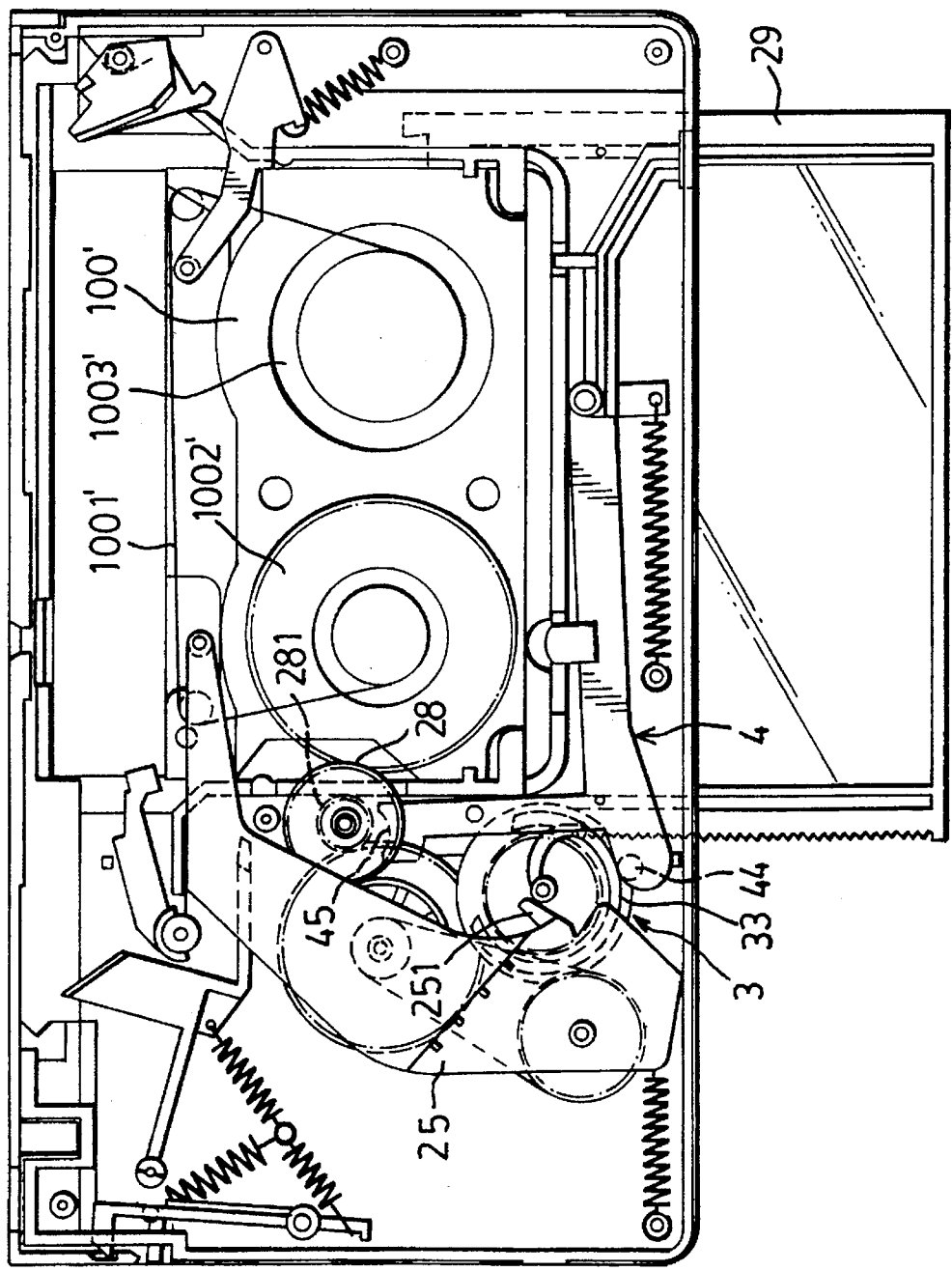
FIG. 10 is a schematic view illustrating how the tape cassette adapter receives a compact tape cassette in accordance with this invention.

Referring to FIGS. 3 and 10, the preferred embodiment of a tape cassette adapter of this invention is used for converting a compact tape cassette 100' into a standard size tape cassette. The compact tape cassette 100' (see FIG. 10) has a tape member 1001' which is wound on a take-up reel 1002' and a supply reel 1003'.

The tape cassette adapter includes a standard cassette case 2, a tape draw-out unit, a reel drive unit, an arm driving unit, a brake lever 4, and a tape-winding control unit 5.

The standard cassette case 2 has a pivotable front cap 21 mounted thereon, a recess formed therein for receiving the compact tape cassette 100', and an upper opening 22 to access the recess. The recess is a rectangular recess which has two opposite side walls 222 and a rear wall 223 that interconnects the opposite side walls 222. Two opposite sides of the upper opening 22 are formed with a pair of grooves 221 so as to allow a rectangular drive cover 29 to associate with the standard cassette case 2 in such a manner that two opposite edges of the drive cover 29 are inserted respectively and slidably within the grooves 221, thereby permitting closing or opening the upper opening 22.

Figure 12:
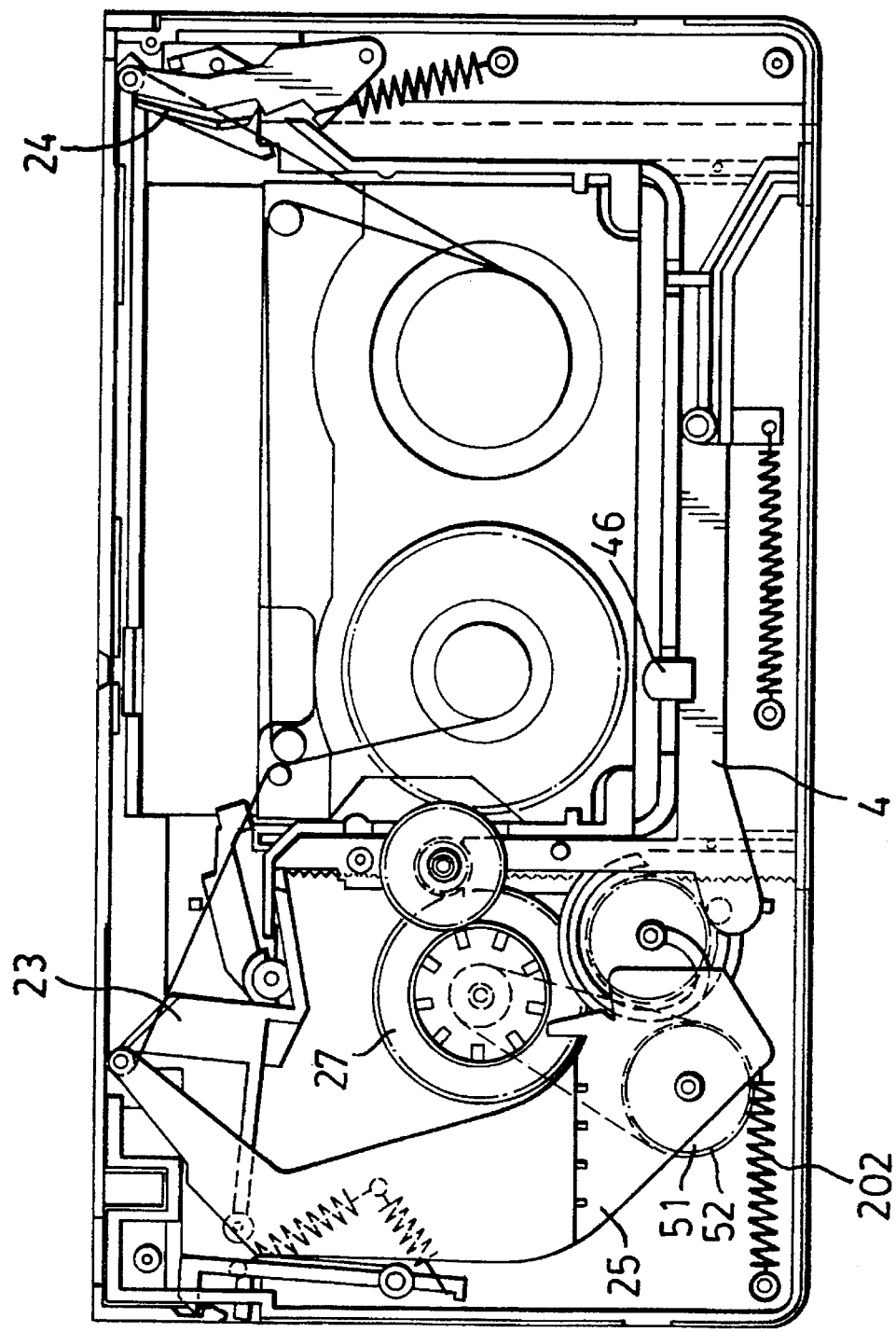
FIG. 12 is a schematic view illustrating how the tape cassette adapter converts the compact tape cassette into the standard size tape cassette in accordance with this invention.

The tape draw-out unit includes a pair of arms 25, 26 which are mounted pivotally within the standard cassette case 2. The arms 25, 26 are movable operatively between first and second positions so as to draw the tape member 1001' in a known manner from the compact tape cassette 100' (see FIG. 10) to form a predetermined tape path (see FIG. 12) responsive to movement from the first position to the second position. The tape draw-out unit further includes a pair of fixing blocks 23, 24 which are mounted pivotally within the standard cassette case 2 and which are restricted to move forward and backward automatically by means of several extension springs in a known manner. When moved forwardly to close the upper opening 22, the drive cover 29 can push the fixing blocks 23, 24 forward to position releasably the arms 25, 26 at their second positions, as shown in FIG. 12, in a known manner.

Figure 6:
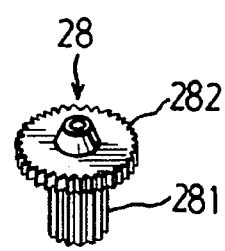
FIG. 6 is a perspective view showing an idle gear of a reel drive unit of the tape cassette adapter according to this invention.
Figure 7:
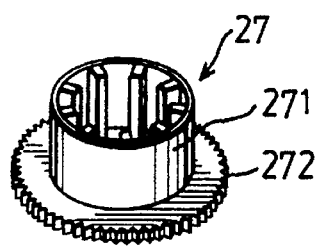
FIG. 7 is a perspective view showing a drive gear of the reel driving unit of the tape cassette adapter according to this invention.

Referring again to FIGS. 3 and 10, the reel drive unit is mounted within the standard cassette case 2 for driving the take-up reel 1002' of the-compact tape cassette 100' and includes a drive gear 27 and an idle gear 28. The drive gear 27, as shown in FIGS. 3 and 7, has a gear member 272 mounted rotatably within the standard cassette case 2, a shaft inserting part 271 formed on a top surface of the gear member 272 for engaging a reel driving shaft from a general domestic video tape player so as to drive the reel drive unit, and a pulley (not shown) formed on a bottom surface of the gear member 272. The idle gear 28, as shown in FIGS. 3 and 6, is mounted rotatably within the standard cassette case 2 and has a lower tooth portion 281 meshing with the gear member 272 of the drive gear 27, and an upper tooth portion 282 engaging the take-up reel 1002' of the compact tape cassette 100' (see FIG. 10) for driving the take-up reel 1002' to wind the tape member 1001' (see FIG. 10) when the drive gear 27 is driven.

Figure 5:
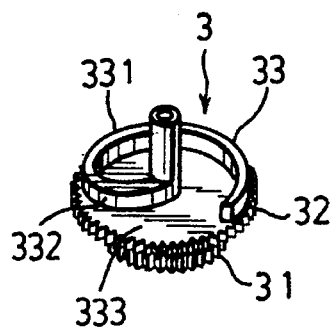
FIG. 5 is a perspective view showing a cam member of an arm-driving unit of the tape cassette adapter according to this invention.
Figure 9:
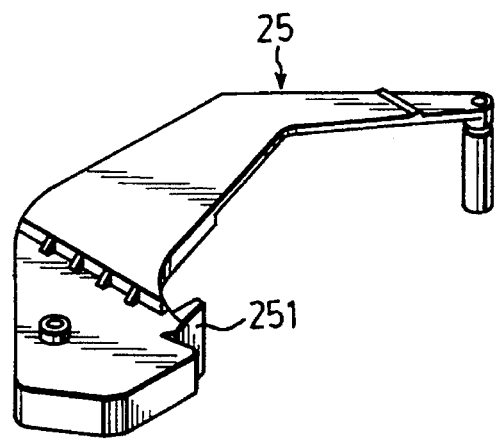
FIG. 9 is a perspective showing one of two arms of a tape draw-out unit of the tape cassette adapter of this invention.
Figure 11:
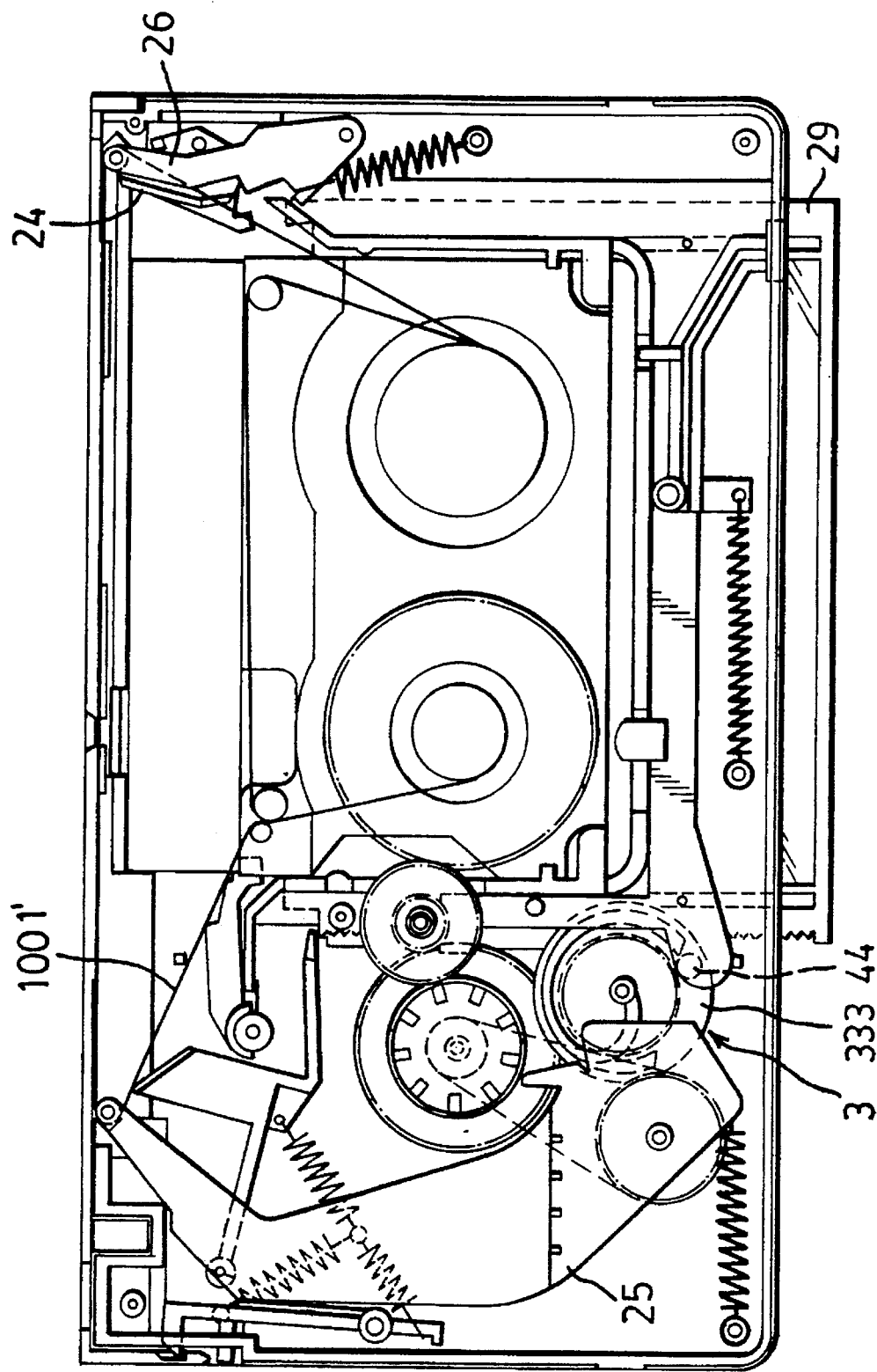
FIG. 11 is a schematic view illustrating how the tape cassette adapter draws a tape member from the compact tape cassette to form a predetermined tape path in accordance with this invention.

Referring to FIGS. 3 and 5, the arm-driving unit has a cam member 3 mounted rotatably within the standard cassette case 2. The cam member 3 engages the corresponding arm 25 and is actuatable so as to move the corresponding arm 25 operatively between its first and second positions. In addition, the arm 26 is moved between its first and second positions by the movement of the drive cover 29 along the grooves 221 in a known manner. The cam member 3 includes a gear wheel 32 and a cam projection 33 which is formed on a top surface of the gear wheel 32 and which has a curved camming face that engages the corresponding arm 25. The arm-driving unit further includes a rack portion 291 which is formed on one of the opposite edges of the drive cover 29 and which engages the gear wheel 32 so as to enable the drive cover 29 to drive rotatably the cam member 3 when the drive cover 29 slides along the grooves 221. The cam projection 33 is a spiral projection which has a generally semi-circular section 331, a gap 333 confined between two ends of the semi-circular section 331, and a curved guide section 332 extending from one of the ends of the semi-circular section 331 to the central portion of the gear member 32. The corresponding arm 25 is formed with a cam follower face 251 (see FIG. 9) adjacent to the cam member 3 on one side of an axis of rotation of the arm 25. The cam follower face 251 and the curved camming face of the cam projection 33 on the cam member 3 are configured so as to cause the corresponding arm 25 to rotate in a same direction as the gear wheel 32. An extension spring 202 interconnects the lower portion of the corresponding arm 25 and the standard cassette case 2 for biasing the corresponding arm 25 toward its first position. The cam follower face 251 of the corresponding arm 25 is engageable with the curved guide section 332 of the cam projection 33, as shown in FIG. 11, so as to guide the corresponding arm 25 between the first and second positions, and is engageable with the semi-circular section 331 of the cam projection 33 so as to maintain the corresponding arm 25 at its second position, as shown in FIG. 12.

The brake lever 4 is mounted operatively within the standard cassette case 2 for engaging releasably the reel drive unit when the arms 25, 26 are at the second position so as to stop unnecessary rotation of the reel drive unit.

Figure 8:
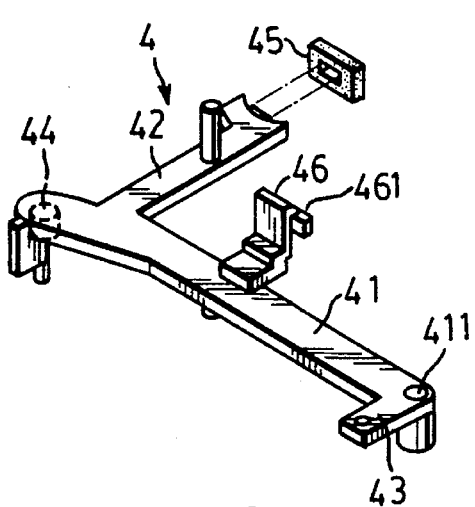
FIG. 8 is a perspective view showing a brake lever of the tape cassette adapter according to this invention.

Referring again to FIGS. 3 and 8, the brake lever 4 includes a substantially L-shaped body which has a first section 41 mounted pivotally within the standard cassette case 2 at a pivot end 411 thereof and located adjacent to the rear wall 223 of the rectangular recess, and a second section 42 located adjacent to one of the opposite side walls 222 of the rectangular recess and provided with a brake element 45 at a distal end thereof for contacting the lower tooth portion 281 of the idle gear 28 of the reel drive unit. The pivot end 411 of the first section 41 has a projection 43 extending rearwardly therefrom. A biasing member 201 interconnects the projection 43 of the first section 41 and the standard Bassette case 2 for biasing the L-shaped body to pivot so as to allow contact between the brake element 45 and the idle gear 28. In this embodiment, the biasing member 201 is an extension spring. The L-shaped body further has a nose 44 projecting outwardly therefrom and being engageable with the cam projection 33 of the cam member 3 so as to release the brake element 45 from the idle gear 28 when the arms 25, 26 move between their first and second positions (see FIG. 10).

It is noted that, when the corresponding arm 25 is rotated to the second position, the nose 44 of the lever handle 4 falls into the gap 333 of the cam projection 33 so that the biasing member 201 can bias the brake element 45 to contact the idle gear 28, thereby stopping unnecessary rotation of the reel drive unit and avoiding overdrawing of the tape member 1001' from the compact tape cassette 100'.

The brake lever 4 further includes a push member 46 which projects forward from an intermediate portion of the first section 41 through an opening of the rear wall 223 and which has an inclined front surface 461. Accordingly, when the standard cassette case 2 is placed into the general domestic video tape player to play the compact tape cassette 100', a reel brake releasing pin (not shown) of the general domestic video tape player extends into the opening of the rear wall 223 to depress the inclined front surface 461 of the push member 46 so as to push the first section 41 rearwardly, thereby releasing the brake element 45 from the idle gear 28 of the reel drive unit. In this way, the reel drive unit can drive the take-up reel 1002' to wind the tape member 1001'.

Figure 1:
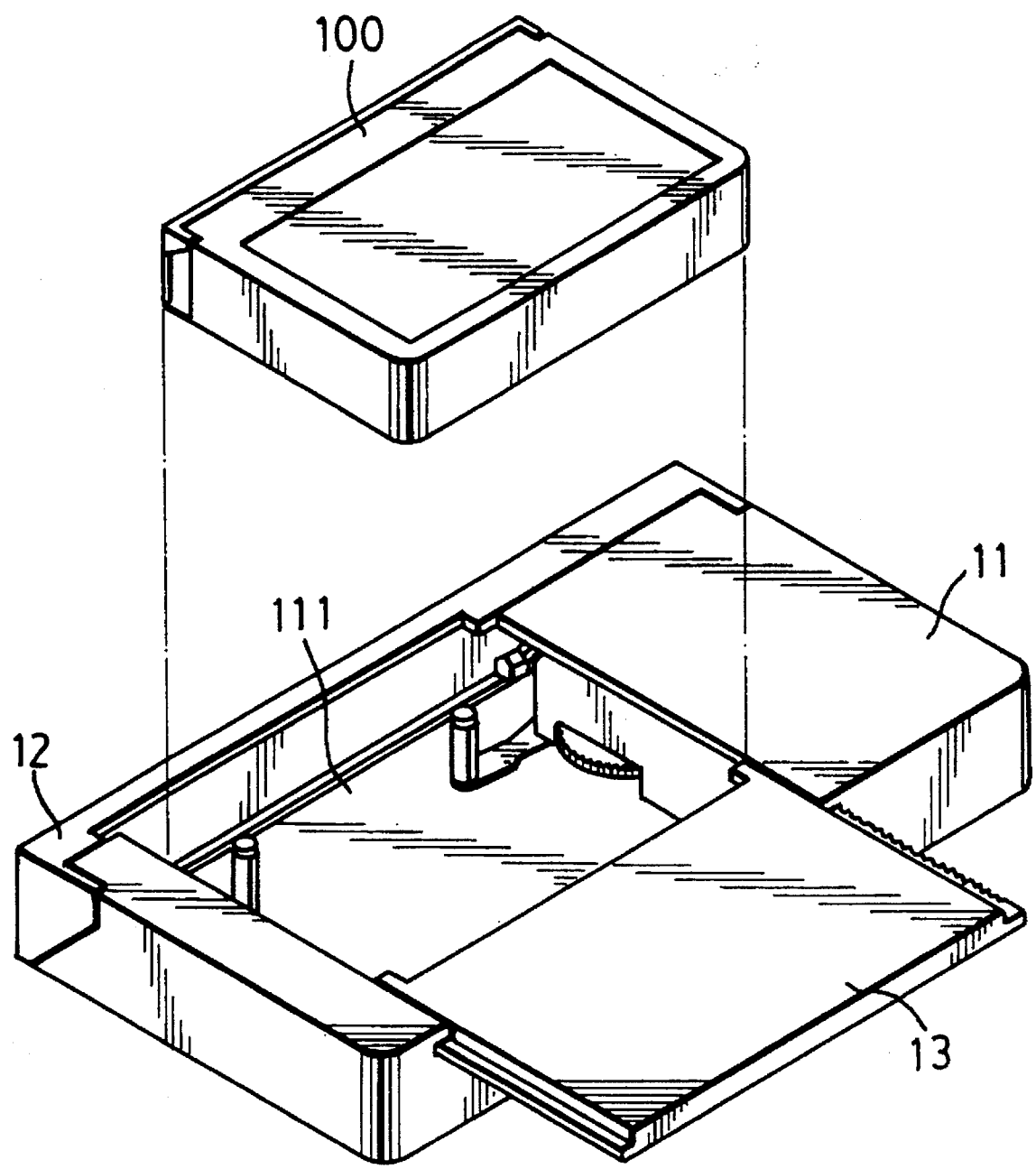
FIG. 1 is a perspective view showing a conventional tape cassette adapter for receiving a compact tape cassette.
Figure 2:
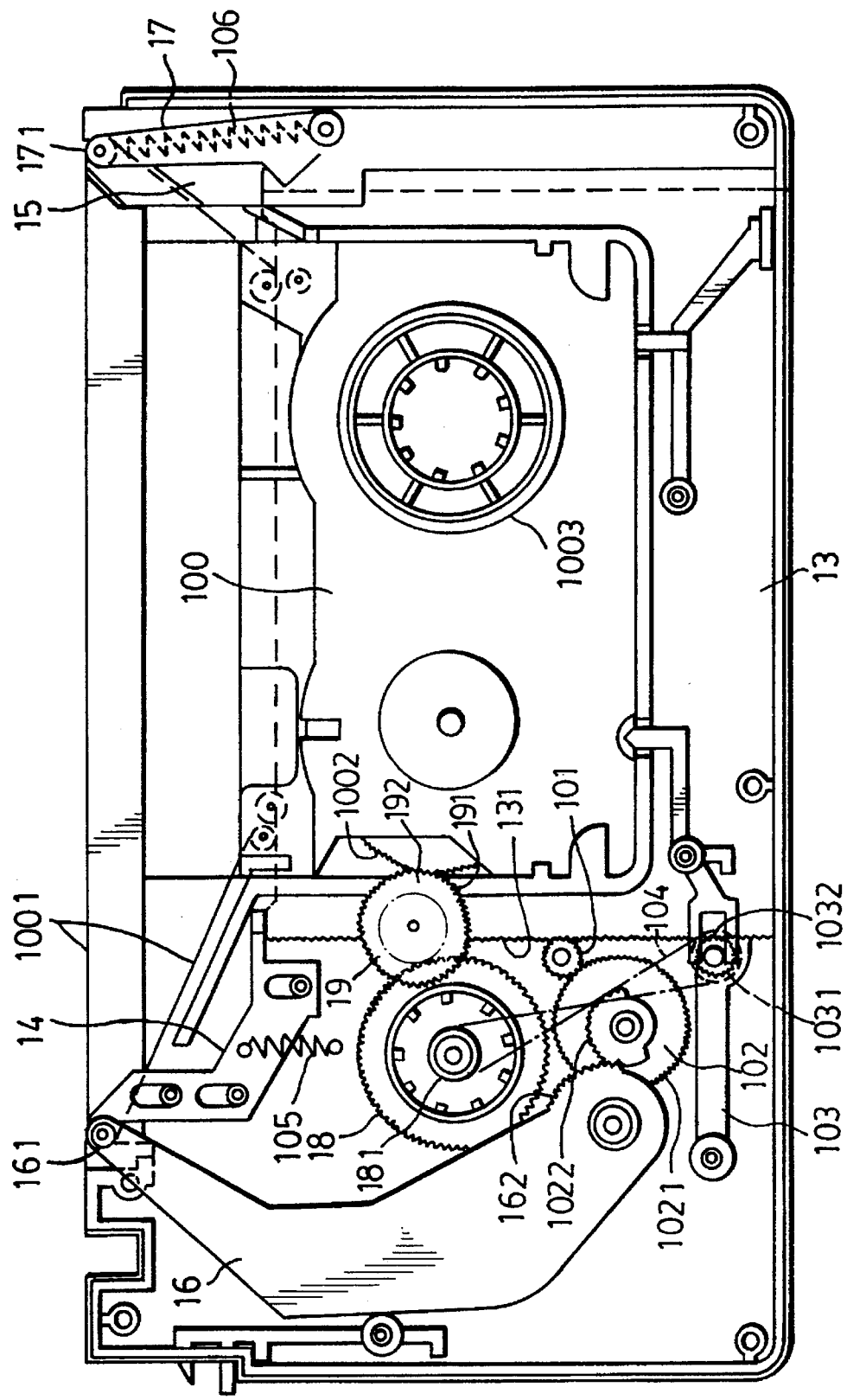
FIG. 2 is a schematic view showing the conventional tape cassette adapter with the compact tape cassette mounted therein.
Figure 4:
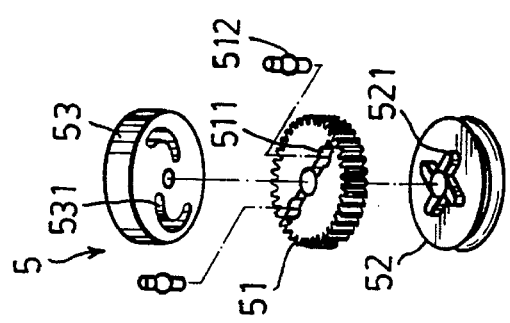
FIG. 4 is an exploded view showing a tape-winding control unit of the tape cassette adapter of this invention.

Referring to FIGS. 3, 4, 10, the tape-winding control unit 5 is mounted rotatably and coaxially to the corresponding arm 25 and is driven rotatably by the cam member 3 of the arm-driving unit. The tape-winding control unit 5 is connected to the reel drive unit and is capable of actuating the reel drive unit to drive the take-up reel 1002' and to wind the tape member 1001' from the predetermined tape path to the compact tape cassette 100' when the arms 25, 26 are moved from the second position to the first position. The cam member 3 of the arm-driving unit further includes a sprocket 31 (see FIG. 5) mounted securely on the bottom surface of the gear wheel 32. The tape-winding control unit 5 includes a pulley 52 mounted rotatably within the standard cassette case 2, a belt 55 (see FIG. 3) connecting the pulley 52 to the pulley of the drive gear 27, and a gear member 51 disposed rotatably and coaxially on the pulley 52. The gear member 51 engages the sprocket 31 of the cam member 3 so as to rotate simultaneously therewith. An annular guide plate 53 is disposed rotatably and coaxially on the gear member 51. The guide plate 53 has two curved guiding grooves 531 that are formed in a bottom surface thereof and that extend from a peripheral portion to a central portion of the guide plate 53. The pulley 52 has four radially extending guiding projections 521 formed on a top surface thereof. The gear member 51 has two radially extending slots 511 formed therethrough and two pins 512 disposed respectively and movably in the slots 511. One of two end portions of each pin 512 extends into a respective one of the guiding grooves 531. When the drive cover 29 is moved rearwardly along the grooves 221, the rack portion 291 can drive cam member 3 so as to rotate the gear member 51 in a direction such that the pins 512 move along the guiding grooves 531 toward the central portion of the guide plate 53. In this way, the other one of the end portions of each pin 512 can engage one of the guiding projections 521 of the pulley 52 so as to rotate the pulley 52 simultaneously with the gear member 51. At the same time, the pulley 52 can drive the drive gear 27 by means of the belt 55 so as to actuate the reel drive unit to drive the take-up reel 1002' thereby winding the tape member 1001' from its predetermined tape path to the compact tape cassette 100', as shown in FIG. 10.

Owing to the presence of the cam member 3, the tape cassette adapter requires fewer parts than the conventional tape cassette adapter. Accordingly, the tape cassette adapter can be manufactured easily and the probability of breakdown on the tape cassette adapter can be decreased.

In addition, since the presence of the brake lever 4 can avoid unnecessary rotation of the take-up reel 1002' of the compact tape cassette 100', overdrawing of the tape member 1001' from the compact tape cassette 100' can be prevented to prevent correspondingly damage to the tape member 1001'.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangement.

I claim:

1. A tape cassette adapter for a compact tape cassette, said compact tape cassette having a tape member wound on a supply reel and a take-up reel and being smaller in size and lighter in weight than a standard size tape cassette, said tape cassette adapter comprising:

a standard cassette case confining a recess for receiving said compact tape cassette and having an upper opening to access said recess;

a tape draw-out unit including a pair of arms mounted pivotally within said standard cassette case and movable operatively between first and second positions so as to draw the tape member from the compact tape cassette to form a predetermined tape path responsive to movement from said first position to said second position;

a reel drive unit mounted within said standard cassette case for driving the take-up reel of the compact tape cassette; and an arm-driving unit having a cam member mounted rotatably within said standard cassette case, said cam member having a curved camming face, one of said arms of said tape draw-out unit being formed with a cam follower face adjacent to said cam member on one side of an axis of rotation of said one of said arms, said cam follower face being acted upon by said curved camming face of said cam member, said cam member being actuatable so as to move said one of said arms operatively between said first and second positions, said camming face and said cam follower face being configured so that said one of said arms rotates in a same direction as said cam member.

2. A tape cassette adapter as claimed in claim 1, wherein said standard cassette case has a pair of grooves formed in two opposite sides of said upper opening, said tape cassette adapter further comprising a drive cover having two opposite edges inserted respectively and slidably within said grooves, said drive cover moving operatively the other one of said arms between said first and second positions when said drive cover slides along said grooves.

3. A tape cassette adapter as claimed in claim 2, wherein said cam member includes a gear wheel and a cam projection which is formed on a top surface of said gear wheel for simultaneous rotation with said gear wheel and which has said camming face formed thereon, said arm-driving unit further including a rack portion which is formed on one of said opposite edges of said drive cover and which engages directly said gear wheel;

whereby, said cam member receives directly an actuation movement from said drive cover via engagement between said gear wheel and said rack portion and transmits the actuation movement to said one of said arms via engagement between said camming face of said cam projection and said cam follower face when said drive cover slides along said grooves.

4. A tape cassette adapter as claimed in claim 3, wherein said cam projection is a spiral projection.

5. A tape cassette adapter as claimed in claim 3, wherein said cam projection has a generally semi-circular section, a gap confined between two ends of said semi-circular section, and a curved guide section extending from one of said ends of said semi-circular section to a central portion of said gear member, said cam follower face being engageable with said curved guide section of said cam projection so as to guide said one of said arms between said first and second positions and being engageable with said semi-circular section of said cam projection so as to maintain said one of said arms at its said second position.

6. A tape cassette adapter as claimed in claim 1, further comprising a brake lever mounted operatively within said standard cassette case for engaging releasably said reel drive unit when said arms are at said second position so as to stop unnecessary rotation of said reel drive unit.

7. A tape cassette adapter as claimed in claim 6, wherein said recess is a rectangular recess which has two opposite side walls and a rear wall that interconnects said opposite side walls, said brake lever including a substantially L-shaped body which has a first section mounted pivotally within said standard cassette case and located adjacent to said rear wall of said rectangular recess, and a second section located adjacent to one of said opposite side walls of said rectangular recess and provided with a brake element for contacting said reel drive unit, said brake lever further including a biasing member interconnecting said L-shaped body and said standard cassette case for biasing said L-shaped body to pivot so as to allow contact between said brake element and said reel drive unit, said L-shaped body further having a nose projecting outwardly therefrom and being engageable with said cam member so as to release said brake element from said reel drive unit when said arms move between said first and second positions.

8. A tape cassette adapter as claimed in claim 1, further comprising a tape-winding control unit mounted rotatably within said standard cassette case and driven rotatably by said arm-driving unit, said tape-winding control unit being connected to said reel drive unit and actuating said reel drive unit to drive the take-up reel and to wind the tape member from the predetermined tape path to the compact tape cassette when said arms move from said second-position to said first position.

9. A tape cassette adapter as claimed in claim 8, wherein said arm-driving unit-further includes a sprocket mounted securely on said cam member, said tape-winding control unit including a pulley mounted rotatably within said standard cassette case, a belt connecting said pulley to said reel drive unit, and a gear member disposed rotatably and coaxially on said pulley, said gear member engaging said sprocket of said arm-driving unit so as to rotate simultaneously therewith, said tape-winding control unit further including a guide plate disposed rotatably and coaxially on said gear member, said guide plate having at least one curved guiding groove that is formed in a bottom surface thereof and that extends from a peripheral portion to a central portion of said guide plate, said pulley having at least one radially extending guiding projection formed on a top surface thereof, said gear member having at least one radially extending slot formed therethrough and at least one pin disposed movably in said slot, one of two end portions of said pin extending into said guiding groove, the other one of said end portions of said pin engaging said guiding projection so as to rotate said pulley simultaneously with said gear member when said gear member is rotated in a direction such that said pin moves along said guiding groove toward said central portion of said guide plate, thereby actuating said reel drive unit.

10. A tape cassette adapter for a compact tape cassette, said compact tape cassette having a tape member wound on a supply reel and a take-up reel and being smaller in size and lighter in weight than a standard size tape cassette, said tape cassette adapter comprising:

a standard cassette case having a recess for receiving said compact tape cassette, an upper opening to access said recess, a pair of grooves formed at two opposite sides of said upper opening, a drive cover having two opposite edges inserted respectively and slidably within said grooves, one of said opposite edges including a rack portions;

a tape draw-out unit including a pair of arms mounted pivotally within said standard cassette case and movable operatively between first and second positions so as to draw the tape member from the compact tape cassette to form a predetermined tape path responsive to movement from said first position to said second position, one of said arms of said tape draw-out unit being formed with a cam follower face;

an am-driving unit having a cam member with a curved camming face, said cam member being mounted rotatably within said standard cassette case, between said rack portion and said one arm for direct engagement with said rack portion and said one arm to move said one arm between said first and second positions in the same direction of rotation as said cam member.

11. A tape cassette adapter as claimed in claim 10, wherein said drive cover cooperates with the other one of said arms to move said other arm between said first and second positions when said drive cover slides along said grooves.

12. A tape cassette adapter as claimed in claim 11, wherein said cam member includes a gear wheel engageable with said rack portion to enable said drive cover to rotatably drive said cam member via said gear wheel when said drive cover slides along said grooves, said gear wheel being formed with a cam projection having said camming face for simultaneous rotation of said camming face with said gear wheel, one of said opposite edges including a rack portion, whereby said cam member receives directly an actuation movement from said drive cover via engagement between said gear wheel and said rack portion and transmits the actuation movement to said one of said arms via engagement between said camming face of said cam projection and said cam follower face when said drive cover slides along said grooves.

13. A tape cassette adapter as claimed in claim 12, wherein said cam projection is a spiral projection.

14. A tape cassette adapter as claimed in claim 12, wherein said gear member has a central portion and said cam projection has a generally semi-circular section with end portions, a curved guide section extending from one of the ends of said semi-circular section to the central portion of said gear member and a gap is defined between the other end of said semi-circular section and the central portion of the gear member, said cam follower face being engageable with said curved guide section of said cam projection to guide said one of said arms between said first and second positions and being engageable with said semi-circular section of said cam projection to maintain said one of said arms at said second position.

15. A tape cassette adapter as claimed in claim 10, further comprising a reel drive unit mounted within said standard cassette case for driving the take-up reel of the compact tape cassette and a brake lever mounted operatively within said standard cassette case for releasably engaging said reel drive unit when said arms are at said second position so as to stop unnecessary rotation of said reel drive unit.

16. A tape cassette adapter as claimed in claim 15, wherein said recess is a rectangular recess which has two opposite side walls and a rear wall that interconnects said opposite side walls, said brake lever including a substantially L-shaped body which has a first section mounted pivotally within said standard cassette case and located adjacent to said rear wall of said rectangular recess, and a second section located adjacent to one of said opposite side walls of said rectangular recess and provided with a brake element for contacting said reel drive unit, said brake lever further including a biasing member interconnecting said L-shaped body and said standard cassette case for biasing said L-shaped body to pivot so as to allow contact between said brake element and said reel drive unit, said L-shaped body further having a nose projecting outwardly therefrom and being engageable with said cam member so as to release said brake element from said reel drive unit when said arms move between said first and second positions.

17. A tape cassette adapter as claimed in claim 10, further comprising a reel drive unit mounted within said standard cassette case for driving the take-up reel of the compact tape cassette and a tape-winding control unit mounted rotatably within said standard cassette case and driven rotatably by said arm-driving unit, said tape-winding control unit being connected to said reel drive unit and actuating said reel drive unit to drive the take-up reel and to wind the tape member from the predetermined tape path to the compact tape cassette when said arms move from said second position to said first position.

18. A tape cassette adapter as claimed in claim 17, wherein said arm-driving unit further includes a sprocket mounted securely on said cam member, said tape-winding control unit including a pulley mounted rotatably within said standard cassette case, a belt connecting said pulley to said reel drive unit, and a gear member disposed rotatably and coaxially on said pulley, said gear member engaging said sprocket of said arm-driving unit so as to rotate simultaneously therewith, said tape-winding control unit further including a guide plate disposed rotatably and coaxially on said gear member, said guide plate having at least one curved guiding groove that is formed in a bottom surface thereof and that extends from a peripheral portion to a central portion of said guide plate, said pulley having at least one radially extending guiding projection formed on a top surface thereof, said gear member having at least one radially extending slot formed therethrough and at least one pin disposed movably in said slot, one of two end portions of said pin extending into said guiding groove, the other one of said end portions of said pin engaging said guiding projection so as to rotate said pulley simultaneously with said gear member when said gear member is rotated in a direction such that said pin moves along said guiding groove toward said central portion of said guide plate, thereby actuating said reel drive unit.

* * * * *